United States Patent [19]
Jakobsson et al.

[11] Patent Number: 5,848,408
[45] Date of Patent: Dec. 8, 1998

[54] METHOD FOR EXECUTING STAR QUERIES

[75] Inventors: Hakan Jakobsson, San Francisco; Cetin Ozbutun, San Carlos; William H. Waddington, Foster City, all of Calif.

[73] Assignee: Oracle Corporation, Redwood Shores, Calif.

[21] Appl. No.: 808,621

[22] Filed: Feb. 28, 1997

[51] Int. Cl.⁶ .................................................. G06F 17/30
[52] U.S. Cl. .................................................. 707/3; 707/2
[58] Field of Search .................................. 707/2, 3, 4, 5

[56] References Cited

U.S. PATENT DOCUMENTS

| | | | |
|---|---|---|---|
| 5,249,262 | 9/1993 | Baule | 395/66 |
| 5,367,675 | 11/1994 | Cheng et al. | 395/600 |
| 5,546,576 | 8/1996 | Cochrane et al. | 395/600 |
| 5,551,031 | 8/1996 | Cheng et al. | 395/600 |
| 5,557,791 | 9/1996 | Cheng et al. | 395/600 |
| 5,668,987 | 9/1997 | Schneider | 707/3 |
| 5,761,657 | 6/1998 | Hoang | 707/4 |

OTHER PUBLICATIONS

Zhao et al. "Array–Based Evaluation of Multi–Dimensional Queries in Object–Relational Database Systems" IEEE, pp. 241–249, Feb. 1998.

Haas "Sampling–Based Selectivity Estimation for Joins Using Augmented Frequent Value Statistics" IEEE, pp. 522–531, Jan. 1996.

Baekgaard et al. "Incremental Computation of Nested Relational Query Expressions" ACM Transactions on Database Systems, vol. 20, No. 2, pp. 111–148, Jun. 1995.

Christophicles et al. "Querying Structured Documents with Hypertext Links using OODBMS" ECHT '94 Proceedings, pp. 188–197, Sep. 1994.

*Primary Examiner*—Thomas G. Black
*Assistant Examiner*—Michael J. Wallace, Jr.
*Attorney, Agent, or Firm*—McDermott, Will & Emery

[57] ABSTRACT

A method and apparatus for processing star queries is provided. According to the method, a star query is transformed by adding to the star query subqueries that are not in the query. The subqueries are generated based on join predicates and constraints on dimension tables that are contained in the original query. The subqueries are executed, and the values returned by the subqueries are used to access one or more bitmap indexes built on columns of the fact table. The bitmaps retrieved for the values returned by each subquery are merged to create one subquery bitmap per subquery. An AND operation is performed on the subquery bitmaps, and the resulting bitmap is used to determine which data to retrieve from the fact table.

20 Claims, 5 Drawing Sheets

FIG. 1

"STORES" (TABLE 102)

| STORE-ID | MANAGER | CITY | STATE |
|---|---|---|---|
| 1020 | JOHNSON | SAN JOSE | CA |
| ... | ... | ... | ... |
| 5034 | SMITH | NY | NY |

"PRODUCTS" (TABLE 104)

| PRODUCT-ID | SOURCE | PARTS | COST |
|---|---|---|---|
| 960 | HASBRO | 5 | $564 |
| ... | ... | ... | ... |
| 572 | NIKE | 2 | $23 |

"SALES" (TABLE 106)

| SALE-ID | STORE-ID | PRODUCT-ID | DATE |
|---|---|---|---|
| 23456 | 1020 | 960 | 12/15/95 |
| ... | ... | ... | ... |
| 76934 | 1020 | 570 | 7/6/96 |

100

TABLE 250

| 1 | LINDA | F |
|---|-------|---|
| 2 | BERT | M |
| 3 | JACK | M |
| 4 | EDDY | M |
| 5 | GREG | M |
| 6 | MIKE | M |
| 7 | ALICE | F |
| 8 | FRED | M |
| 9 | PETER | M |
| 10 | RUSS | M |

FIG. 2b

METHOD FOR EXECUTING STAR QUERIES

FIELD OF THE INVENTION

The present invention relates to database systems, and more specifically, to the execution of star queries within database systems.

BACKGROUND OF THE INVENTION

In relational database systems, a star schema is distinguished by the presence of one or more relatively large tables and several relatively smaller tables. Rather than duplicating the information contained in the smaller tables, the large tables contain references (foreign key values) to rows stored in the smaller tables. The larger tables within a star schema are referred to as "fact tables", while the smaller tables are referred to as "dimension tables". FIG. 1 illustrates an exemplary star schema with two dimensions.

Referring to FIG. 1, it illustrates a database 100 that includes tables 102, 104 and 106. Table 102 is named "store" and contains information about each of the stores in which sales may occur. Each row in store table 102 contains a unique store-id and information about the particular store that corresponds to the store-id. Table 104 is named "product" and contains information about each type of product that may be sold in any of the stores. Each row in product table 104 contains a unique product-id and information about the particular product.

Table 106 is named "sale" and contains information about each sale in each of the stores represented in the store table 102. Each row in sale table 106 includes a unique sale-id, a store-id to indicate the store at which the sale was made, a product-id to indicate the product sold in the sale, and the date of the sale. Typically, the number of sales will be vastly greater than both the number of stores at which the sales are made and the number of products carried by the stores. Detailed information about the store and product involved in a sale transaction does not have to be stored in the rows of table 106 because such detailed information is available in tables 102 and 104, respectively. Instead, the rows of table 106 simply contain values (store-ids and product-ids) that reference information stored in the other tables 102 and 104. Therefore, tables 102, 104 and 106 constitute a star schema in which table 106 is the fact table and tables 102 and 104 are dimension tables.

Queries that operate on data stored in tables that belong to a star schema are referred to as star queries. Star queries are particularly difficult to process because they specify which data must be retrieved from the fact table using constraints on values stored in the dimension tables. For example, an SQL query to determine the dates of all sales of products that cost more than $1,000 from stores in San Jose would be:

| QUERY 1 |
| --- |
| select sales.date from sales, stores, products<br>where sales.store-id = stores.store-id<br>and sales.product-id = products.product-id<br>and stores.city = San Jose<br>and products.cost > $1,000 |

Query 1 may be executed by (1) using an index built on the city column of the stores table 102 to determine the set of all of the stores that are in San Jose ("SET1"), (2) using an index built on the cost column of the products table 104 to determine the set of all of the products that cost more than $1,000 ("SET2"), and (3) using an index built on the store-id, product-id columns of the sales table 106 to determine all rows that include both a store-id from SET1 and a product-id from SET 2.

Unfortunately, this method of executing star queries has significant drawbacks. Specifically, building indexes for each possible combination of fact table columns may be cost prohibitive, especially when there are many dimensions and the fact table contains numerous foreign key columns. However, if indexes are not built for all combinations of columns, then an index built on the exact columns of the fact table that are constrained by any given query may not exist.

Indexes built on a superset of the columns constrained by a query are not always helpful. For example, an index built on key1, key2, key3 is useless for a query that does not specify a constraint for key1. Use of indexes built on a subset of the columns constrained by a query may not be efficient either. For example, if an index exists for the "store-id" column of sales table 106, but not for the store-id, product-id columns, then all of the rows in the sales table 106 that contain store-ids from SET1 would have to be retrieved and inspected to determine if they also contain product-ids from SET2. Since each constraint alone may not significantly constrain the query, conventional join techniques typically require scanning a large portion of the fact table when only a very small number of the rows in the fact table actually satisfy all of the constraints of the query.

Another problem with the method of executing star queries described above is that the number of value combinations that satisfy the specified criteria may be vastly larger than the actual number of rows that satisfy the specified criteria. For example, there may be 50,000 products that cost more than $1,000 and there may be 50 stores in San Jose. However, products that cost more than $1,000 may have been sold only three times in San Jose. Therefore, the store-id, product-id index would have to be accessed for 250,000 combinations of store-id, product-id in order to find the three rows that actually satisfy the criteria specified in the query. Further, the number of combinations that must be tested increases greatly as the number of dimension tables in the query increases.

An alternative approach to executing star queries is described in Graefe, G. O'Neil, P. E. "Multiple-table Joins Through Bitmapped Join Indices", SIGMOD Record, Vol. 24, No. 3, September, 1995. According to this approach, a "join index" is used to access the fact table. A join index assumes a join on a particular set of columns between the fact table and one or more dimension tables. If the join is between the fact table and a dimension table on the normal join columns, it is possible to create a join index for other dimension table columns and the fact table.

A join index has index entries that may have the form <key, bitnap>, where "key" is a value from the dimension table column on which the index is built, and "bitmap" is a bitmap of the fact table indicating those rows in the fact table that would match the key according to the assumed join. Alternatively, the join index can have the format <rowid, bitmap>, where "rowid" identifies a particular row in a dimension table and "bitmap" represents the fact table rows that join with the particular row in the dimension table. Join indexes may also employ an actual list of rowids instead of bitmaps in the index entries.

Creating a join index is tantamount to precomputing a join. Join indexes may greatly increase the cost and/or complexity of doing updates and loading new data.

Based on the foregoing, it is clearly desirable to provide a system and method for processing star queries in a manner that reduces the amount of information that must be retrieved from a fact table during the processing of a query. It is further desirable that the technique require less overhead than prior attempts to decrease the amount of fact table data accessed during star query processing.

SUMMARY OF THE INVENTION

A method and apparatus for processing star queries is provided. According to the method, a star query is transformed by adding to the star query subqueries that are not in the query. The subqueries are generated based on join predicates and constraints on dimension tables that are contained in the original query. The subqueries are executed, and the values returned by the subqueries are used to access one or more bitmap indexes built on columns of the fact table. The bitmaps retrieved for the values returned by each subquery are merged to create one subquery bitmap per subquery. An AND operation is performed on the subquery bitmaps, and the resulting bitmap is used to determine which data to retrieve from the fact table.

BRIEF DESCRIPTION OF THE DRAWINGS

The present invention is illustrated by way of example, and not by way of limitation, in the figures of the accompanying drawings and in which like reference numerals refer to similar elements and in which:

FIG. 1 is a drawing of an exemplary star schema;

FIG. 2b is a table on which a bitmap index may be built;

DETAILED DESCRIPTION OF THE PREFERRED EMBODIMENT

A method and apparatus for processing star queries is described. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

HARDWARE OVERVIEW

Figure 2A:
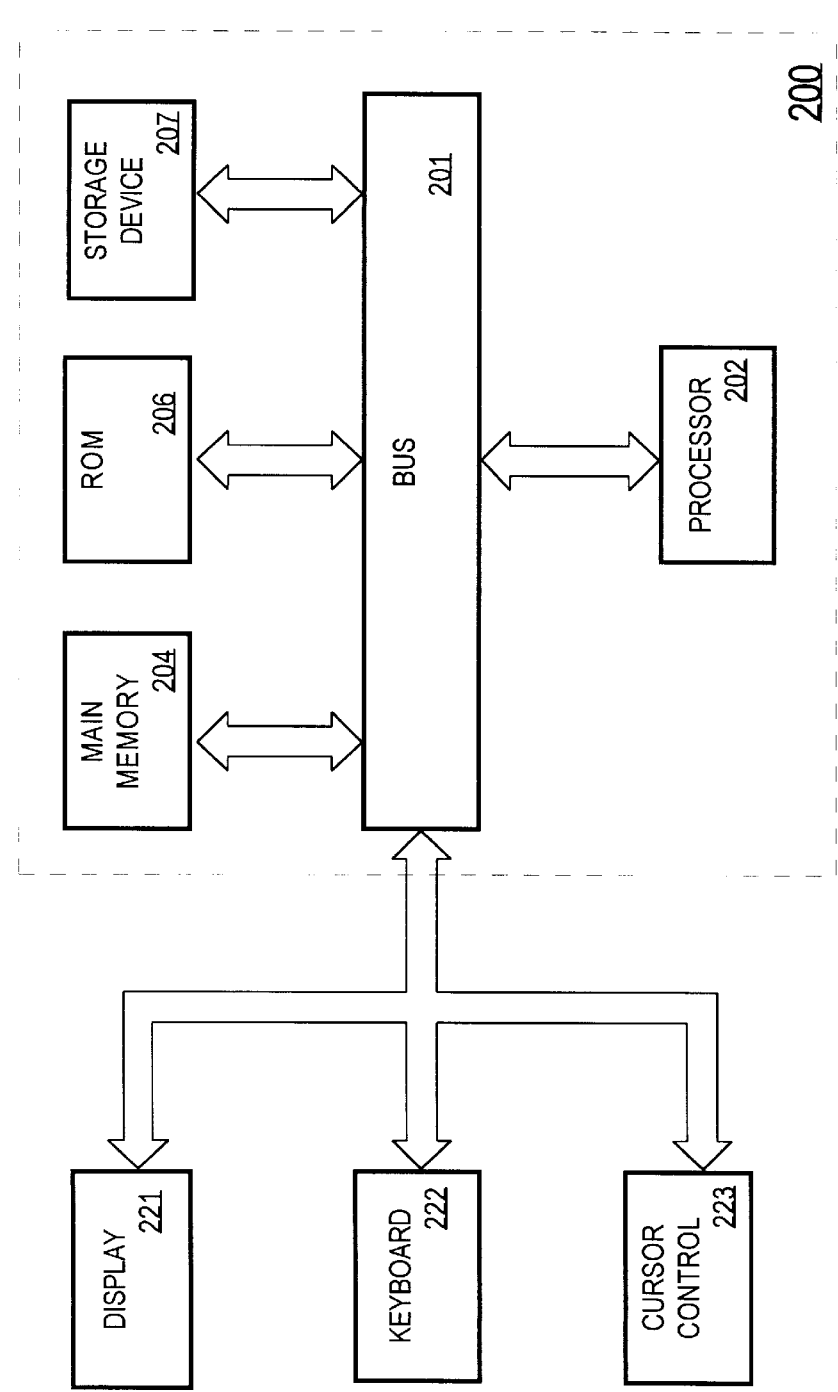
FIG. 2a is a block diagram of a computer system upon which an embodiment of the present invention may be implemented.

Referring to FIG. 2a, it is a block diagram of a computer system 200 upon which an embodiment of the present invention can be implemented. Computer system 200 includes a bus 201 or other communication mechanism for communicating information, and a processor 202 coupled with bus 201 for processing information. Computer system 200 further comprises a random access memory (RAM) or other dynamic storage device 204 (referred to as main memory), coupled to bus 201 for storing information and instructions to be executed by processor 202. Main memory 204 also may be used for storing temporary variables or other intermediate information during execution of instructions by processor 202. Computer system 200 also comprises a read only memory (ROM) and/or other static storage device 206 coupled to bus 201 for storing static information and instructions for processor 202. Data storage device 207 is coupled to bus 201 for storing information and instructions.

A data storage device 207 such as a magnetic disk or optical disk and its corresponding disk drive can be coupled to computer system 200. Computer system 200 can also be coupled via bus 201 to a display device 221, such as a cathode ray tube (CRT), for displaying information to a computer user. Computer system 200 further includes a keyboard 222 and a cursor control 223, such as a mouse.

The present invention is related to the use of computer system 200 to process star queries. According to one embodiment, star query processing is performed by computer system 200 in response to processor 202 executing sequences of instructions contained in memory 204. Such instructions may be read into memory 204 from another computer-readable medium, such as data storage device 207. Execution of the sequences of instructions contained in memory 204 causes processor 202 to perform the process steps that will be described hereafter. In alternative embodiments, hard-wired circuitry may be used in place of or in combination with software instructions to implement the present invention. Thus, the present invention is not limited to any specific combination of hardware circuitry and software.

BITMAP INDEXES

According to one embodiment of the invention, star queries are processed using bitmap indexes built on the columns of the fact table. A bitmap index is an index that includes a set of bitmaps that can be used to efficiently process queries on a body of data associated with the bitmap index. In the context of bitmap indexes, a bitmap is a series of bits that indicate which of the records stored in the body of data satisfy a particular criteria. Each record in the body of data has a corresponding bit in the bitmap. Each bit in the bitmap serves as a flag to indicate whether the record that corresponds to the bit satisfies the criteria associated with the bitmap.

Typically, the criteria associated with a bitmap is whether the corresponding records contain a particular key value. In the bitmap for a given key value, all records that contain the key value will have their corresponding bits set to 1 while all other bits are set to 0. A collection of bitmaps for the key values that occur in the data records can be used to index the data records. In order to retrieve the data records with a given key value, the bitmap for that key value is retrieved from the index and, for each bit set to 1 in the bitmap, the corresponding data record is retrieved. The records that correspond to bits are located based on a mapping function between bit positions and data records.

For example, FIG. 2b illustrates a table 250 that contains ten rows, where each row contains a name and a gender indicator. Rows 2, 3, 4, 5, 6, 8, 9 and 10 contain male gender indictors. Rows 1 and 7 contain female gender indicators. Therefore, the bitmap of table 250 for the criteria "GENDER=MALE" would be 0111110111, where the "1"s in positions 2–6 and 8–10 indicate that the second through sixth and eighth through tenth rows of table 250 satisfy the "GENDER=MALE" criteria, and the zeros in the first and seventh positions indicate that first and seventh rows in table 250 do not satisfy the "GENDER=MALE" criteria.

When retrieving data using a bitmap index, several logical retrieval conditions may be combined using Boolean operations on the appropriate bitmaps. For example, if the data that is to be retrieved is subject to the conditions that key1=<val1> and key2=<val2>, a bitwise AND of the bitmaps for key values <val1> and <val2> can be performed to generate a bitmap that indicates the data items that match both conditions.

According to one embodiment, a method is provided for translating each constraint on the dimension tables to a set of index keys for the bitmap indexes that are built on the fact table columns. The bitmaps associated with the index keys may then be combined according to the logic of the star query to produce a resulting bitmap that identifies the rows of the fact table that satisfy the star query. To translate constraints on the dimension tables into index keys for the fact table, the initial star query is transformed using techniques that will be described hereafter.

STAR QUERY FORMAT

Star queries typically contain clauses which (1) identify the fact table and dimension tables, (2) specify the correspondence between the fact table columns and the dimension table columns, and (3) specify the constraints on the dimension table columns. For example, star queries in SQL typically have the form:

---
QUERY 2
---
select . . . from fact, dim1, dim2, . . . , dimn
where fact.key1 = dim1.key
and fact.key2 = dim2.key
and . . . and fact.keyn = dimn.key
and <dimension table constraints>
---

In Query 2, the fact table is named "fact" and the dimension tables are named "dim1" through "dimn". The "where" clause includes expressions that equate columns in the fact table with corresponding columns in the dimension tables. Such expressions are referred to herein as "join predicates". For example, the expression "fact.key1= dim1.key" is a join predicate that specifies that the column "key1" in the fact table corresponds to the column "key" in the dimension table that is named "dim1".

The <dimension table constraints> is a number of predicates referring to some or all of the dimension tables (but not the fact table) that restrict the query to some subset of the rows in the constrained tables. For example, the query:

---
QUERY 3
---
select sales.date from sales, stores, products
where sales.store-id = stores.store-id
and sales.product-id = products.product-id
and stores.city = 'San Jose'
and products.cost > $1,000
includes the dimension table constraints "stores.city = San Jose" and "products.cost > $1,000".
---

STAR QUERY TRANSFORMATION

According to an embodiment of the invention, a star query (or the internal representation of a star query) is transformed by adding to the WHERE clause of the star query additional subqueries. These additional subqueries are constructed from the join predicates and dimension table constraints contained in the original star query. Specifically, for each constrained dimension k, an IN subquery is generated of the form:

fact.keyk IN (select dimk.key from dimk where <dimk constraints>)

In the above expression, fact.keyk is the column of the fact table that a join predicate correlates with the "key" column of "dimk". For example, the query:

---
QUERY 4
---
select * from fact, dim1, dim2, dim3
where fact.key1 = dim1.key
and fact.key2 = dim2.key
and fact.key3 = dim3.key
and dim1.c3 > 4 and (dim1.c6 = 10 or dim1.c6 = 11)
and dim3.c5 between 100 and 1000
---

Query 4 contains a dimension table constraint "dim1.c3>4 and (dim1.c6=10 or dim1.c6=11)" for dim1. The query contains a join predicate "fact.key1=dim1.key" which specifies a correlation between the "key" column of dim1 and the "key1" column of the fact table. Based on these expressions, the following subquery would be generated:

fact.key1 in (select dim1.key from dim1 where dim1.c3>4 and (dim1.c6=10 or dim1.c6=11))

Query 4 also specifies a dimension table constraint "dim3.c5 between 100 and 1000" for dim3. The query contains a join predicate "fact.key3=dim3.key" which specifies a correlation between the "key" column of dim3 and the "key3" column of the fact table. Based on these expressions, the following subquery would be generated:

fact.key3 in (select dim3.key from dim3 where dim3.c5 between 100 and 1000)

The subqueries generated in this manner are ANDed to the other predicates that constrain the dimension table dimk. In the present example, the resulting "transformed" star query is:

---
QUERY 5
---
select * from fact, dim1, dim2, dim3
where fact.key1 =dim1.key
and fact.key2 = dim2.key
and fact.key3 = dim3.key
and dim1.c3 > 4 and (dim1.c6 = 10 or dim1.c6 = 11)
and dim3.c5 between 100 and 1000
and fact.key1 in (select dim1.key from dim1
    where dim1.c3 > 4 and (dim1.c6 = 10 or dim1.c6 = 11))
and fact.key3 in (select dim3.key from dim3
    where dim3.c5 between 100 and 1000)
---

It is not required to generate subqueries for all constrained dimensions. For example, a star query transformation mechanism may be configured to determine how restrictive a dimension table constraint is. If the transformation mechanism determines that a dimension table constraint is satisfied by more than a threshold number of rows in the relevant dimension table, then the transformation mechanism may determine not to generate a subquery based on that particular dimension table constraint.

STAR QUERY TRANSFORMATION WITH SNOWFLAKE SCHEMAS

A snowflake schema is a star schema in which the dimension tables themselves have dimension tables. For example, the store table 102 in FIG. 1 is a dimension table for the sales table 106. One of the columns of the store table 102 is "manager". The "manager" column of store table 102 may contain values from a primary key "manager" column of a "manager" table (not shown). The manager table could include additional information about each manager, such as the home address, social security number, and phone number of each manager.

In the present example, the store table 102 may be considered a first level dimension table, since it stores further information about a dimension of the fact table, while the manager table may be considered a second level dimension table because it stores further information about a dimension of a first level fact table. There may be any number of levels of dimension tables in a snowflake schema. Further, an N level dimension table may itself have any number of N+1 level dimension tables.

Star queries associated with snowflake schemas are similar to star queries for conventional star schemas except that star queries for snowflake schemas may include (1) constraints for columns of second or higher level dimension tables, and (2) join predicates that establish a correlation between a foreign key columns of lower level dimension tables and primary key columns of higher level dimension tables.

For example, assume that a fact table has been normalized into three first level dimension tables dim1, dim2 and dim3. Further assume that one of the first level dimension tables "dim1" has been normalized into three second level dimension tables d11, d12 and d13. The following star query contains a constraint on a column of the second level dimension table d12 as well as the first level dimension table dim2:

---
QUERY 6 select * from fact, d11, d12, d13, d1, d2, d3
where fact.key1 = dim1.key
and fact.key2 = dim2.key
and fact.key3 = dim3.key
and dim1.key11 = dim11.key
and dim1.key12 = dim12.key
and dim1.key13 = dim13.key
and dim12.c4 = 20
and dim2.c7 > 100
---

According to an embodiment of the invention, the star queries for snowflake schemas are transformed in the same manner as star queries for conventional star schemas in that subqueries are generated based on constraints specified for dimension tables. For example, the constraint "dim2.c7>100" would result in the generation of the subquery:

fack.key2 in (select dim2.key from dim2 where dim.c7>100)

However, with snowflake schemas, a subquery generated based on a constraint specified for a higher level dimension table must include join predicates to connect the constrained dimension table back to a first level dimension table. In the exemplary query given above, the constraint "dim12.c4=20" on dim12 is a constraint on a second level dimension table. The join predicate that connects dim12 to a first level dimension table is "dim1.key12=dim12.key". Therefore, the subquery generated for the constraint "dim12.c4=20" must contain the join predicate "dim1.key12=dim12.key". Thus, the following subquery may be generated based on the "dim12.c4=20" constraint:

fact.key1 in (select dim1.key from dim1, dim12 where dim1.key12=dim12.key and dim12.c4=20)

ANDing these subqueries to the WHERE clause of the original star query results in Query 7.

---
QUERY 7 select * from fact, d11, d12, d13, d1, d2, d3
where fact.key1 = dim1.key
and fact.key2 = dim2.key
and fact.key3 = dim3.key
and dim1.key11 = dim11.key
and dim1.key12 = dim12.key
and dim1.key13 = dim13.key
and dim12.c4 = 20
and dim2.c7 > 100
and fact.key2 in (select dim2.key from dim2
    where dim2.c7 > 100)
and fact.key1 in (select dim1.key from dim1, dim12
    where dim1.key12 = dim12.key and dim12.c4 = 20)
---

QUERY EXECUTION

Figure 3:
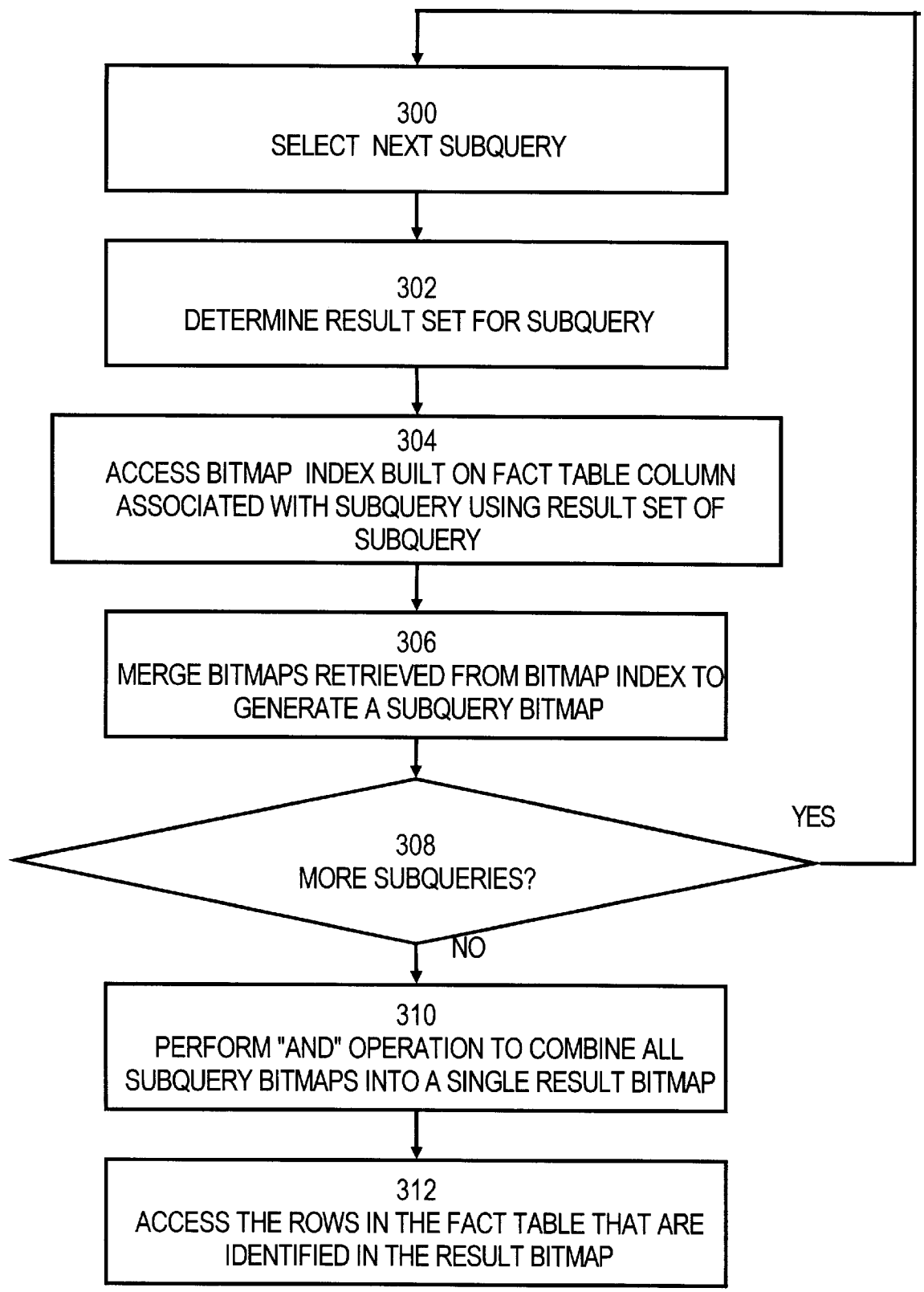
FIG. 3 is a flow chart illustrating steps for executing a transformed star query according to an embodiment of the invention.

According to one embodiment of the invention, execution of the transformed star query is performed according to the steps illustrated in FIG. 3. Referring to FIG. 3, steps 300 and 308 define a loop during which steps 302, 304 and 306 are executed for each subquery contained in a transformed star query. Specifically, at step 302 a result set is determined for a subquery. The result set of a subquery is the set of primary key values associated with rows in the dimension table that satisfy the criteria specified in the SELECT-list of the subquery. For example, the result set of the subquery:

fact.key2 in (select dim2.key from dim2 where dim2.c7>100)

is the set of primary key values for the rows in dim2 that have values greater than 100 in column c7. This set of values is also the set of join values for the fact table column with the dimension table that is specified in the subquery.

At step 304, a bitmap index built on the column of the fact table for which a subquery was generated is accessed using the values from the result set of the subquery. For example, assume that the result set of the subquery:

fact.key2 in (select dim2.key from dim2 where dim2.c7>100)

is the set containing the primary key values: pk1, pk2 and pk3. During step 304, these values are used as keys to retrieve corresponding bitmaps from a bitmap index built on column key2 of the fact table.

At step 306, all of the bitmaps retrieved for a particular result set are merged using a logical OR operation to produce a single "subquery bitmap". The resulting subquery bitmap will indicate exactly those rows in the fact table that have values matching those generated by the subquery, and hence, those rows that match the dimension table constraints in the WHERE-clause.

As mentioned above, steps 302, 304 and 306 are repeated for each subquery, resulting in the generation of one subquery bitmap for each subquery contained in the transformed star query. Once one such bitmap has been generated for each subquery, a logical AND of those bitmaps is performed at step 310 to produce a single "result" bitmap. The result bitmap indicates exactly those rows in the fact table that simultaneously meet all the dimension table constraints for which subqueries were generated. This result bitmap can then be used at step 312 to access the fact table to retrieve the indicated set of rows. This set of rows is then joined with the dimension tables and generally processed in accordance with what the original SQL-statement stipulates.

The existence of the subqueries does not change the result of the query. However, the number of fact table rows specified in the result bitmap may be significantly smaller than the number of rows that would have to be retrieved from the fact table using conventional star query processing. Thus, the creation of subqueries and the use of the subqueries to generate a result bitmap provides a new efficient access path to the fact table to retrieve (a superset of) those rows that are needed in order to computer the answer to the original star query.

Significantly, the star query transformation and execution technique described herein does not rely on the use of multi-column concatenated indexes. Consequently, the application of the technique is not limited by the key order used by such indexes. Further, the techniques described herein may be used even if the original star query has a join on one or more unconstrained dimension tables.

The execution technique has been described with reference to bitmap indexes. However, the technique may be used with any type of index structure that produces results that can be combined in logical AND and OR operations. Thus, the present invention is not limited to the use of bitmap indexes. For example, the output of typical B-tree indexes is a set of rowids. These union of these sets of rowids may be generated to perform a logical OR operation. The intersection of the sets may be taken to perform a logical AND operation.

ROW SOURCE TREES

Figure 4:
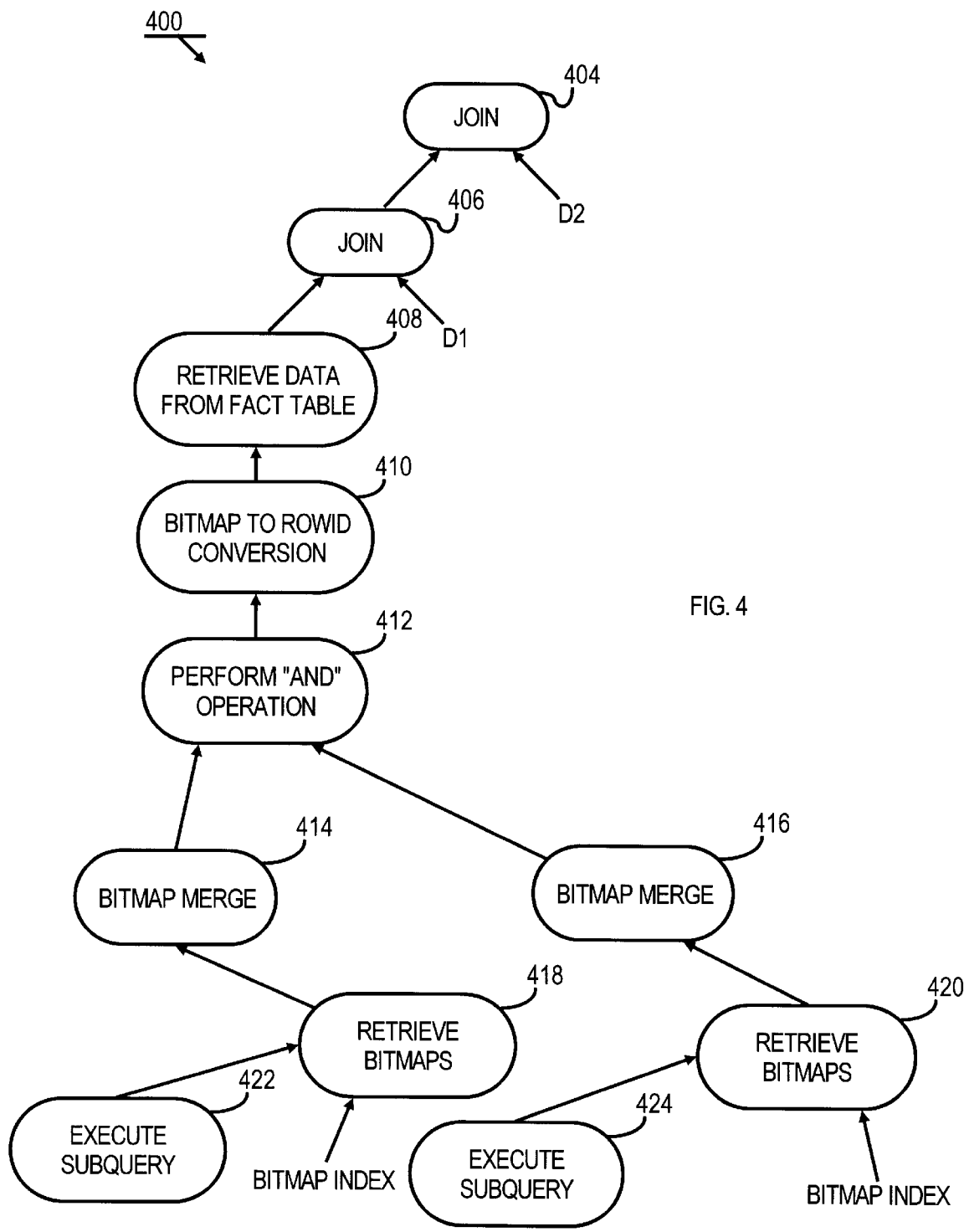
FIG. 4 is a diagram of a row source tree illustrating the execution plan of a transformed star query according to an embodiment of the invention.

The operations required to execute a particular query may be illustrated in the form of a row source tree, where each node of the tree represents an operation that generates data, and the nodes are connected such that child nodes represent operations that supply input data for the operations represented in parent nodes. For example, FIG. 4 illustrates an exemplary row source tree 400 for a star query with two dimension tables, where subqueries are generated for both dimensions using the star query transformation techniques described above.

In the illustrated row source tree 400, nodes 422 and 424 represent execution of the two subqueries. The result of execution of the subqueries will be sets of rowids. The dimension table primary key values generated at nodes 422 and 424 are used to retrieve bitmaps at nodes 418 and 420, respectively. As mentioned above, these bitmaps are retrieved from bitmap indexes built on columns of the fact table.

The bitmaps retrieved at nodes 418 and 420 are merged at nodes 414 and 416 to produce subquery bitmaps. The subquery bitmaps generated at 414 and 416 are ANDed at node 412 to produce a result bitmap. The result bitmap is converted to a set of rowids at node 410, which are used to retrieve data from the fact table at node 408. The data retrieved from the fact table is joined with a first dimension table at node 406. The joined data produced at node 406 is then joined with data from a second dimension table at node 404.

JOIN ELIMINATION

If a subquery has been generated for a dimension, it is possible to avoid the join operation back to the dimension table associated with the dimension under certain conditions. Specifically, if the dimension table join column is known to be unique, due to the existence of a unique constraint or unique index, the generation of a subquery for the dimension will be sufficient to guarantee that exactly the right rows will be retrieved from the fact table with respect to the join. That is, the uniqueness property of the dimension table column guarantees that the join back to the fact table could not result in a row from the fact table giving rise to more than one row in the join result. Under these conditions, the join back to the dimension table can be eliminated provided that the original query contains no references to columns in that particular dimension table other than the join predicate and the constraints that are used in the subquery WHERE-clause.

In Query 7, no joins can be eliminated since the original query is of the form SELECT *. Hence, all the columns of all the tables are implicitly referred to in the SELECT-list and the joins with the dimension tables are needed in order to generate data for the output. However, if the original query been of the form SELECT COUNT(*), then the join back to the dimension table d2 could have been avoided provided that the column d2.key was known to be unique.

PARALLELIZING QUERY EXECUTION

Multi-processing systems are typically partitioned into nodes, where each node may contain multiple processors executing multiple concurrent processes. To fully utilize the computing power of a multi-processing system, a database application may divide a large processing task required by a query into smaller work granules which may then be distributed to processes running on one or more processing nodes. Because the various work granules are being performed in parallel, the processing required by the query can be completed much faster than if the processing were performed on a single node by a single process. One mechanism for implementing parallel operations in a database management system is described in U.S. patent application Ser. No. 08/441,527 entitled "Method and Apparatus for Implementing Parallel Operations in a Database Management System" filed on May 15, 1995, by Gary Hallmark and Daniel Leary, incorporated herein by reference.

To parallelize the execution of a star query, the work to be done on the fact table is dynamically partitioned by rowid range to create "work granules". The work granules are than assigned to a set of processes. These processes, referred to herein as parallel query slaves, execute their assigned work granules in parallel with the other parallel query slaves. Each parallel query slave evaluates the subqueries and performs the table access with respect to just a part of the fact table specified by the rowid range.

The restriction to a certain rowid range on the operations performed in each slave can be "pushed down" into the retrieval of the bitmaps in the bitmap indexes so that sections of the bitmaps covering parts of the fact table outside the given rowid range are skipped. For example, if a slave process is assigned the work granule associated with the rowid range 1000 to 5000, then that slave process would only retrieve the portion of each bitmap that corresponds to rowid range 1000 to 5000.

In an alternative embodiment, the object being worked on (e.g. the fact table) is dynamically or statically partitioned. Each slave process is assigned work associated with a particular partition of the fact table.

According to one embodiment of the invention, the subqueries contained in a transformed star query are reevaluated for each sub-partition of the operation. For example, the task of evaluating a subquery may be assigned to a set of parallel slave processes, where each slave process in the set evaluates the subquery for a particular rowid range. The rowid ranges for the different slave processes are rowid ranges of the fact table. A slave assigned a particular fact table rowid range evaluates the subqueries in their entirety. However the rowid range restriction is used to access the bitmap indexes on the fact table. In alternative embodiment, the subqueries are evaluated just once and the results are broadcast to all slaves that need them rather than having each slave do its own evaluation.

According to one embodiment, the joins back to the dimension tables are combined with the subquery evaluation and table access of the fact table that is performed in each slave. This causes the scan of the dimension table, rather than the data from the fact table, to be broadcast from one slave set to another. Broadcasting the scan of the dimension table is typically more efficient because the size of the dimension tables will in general be much smaller than that of the data retrieved from the fact table. In another embodiment, the joins are not combined with the operation on the fact table. Under these conditions, once the data from the fact table has been retrieved, the data is repartitioned between the slaves for the joins back with the dimension tables.

When handling multiple fact tables, the join of the one fact table with the output of the other fact table is not combined even if the joins of the dimension tables are being combined.

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A method for processing a query that requires retrieval of data from a fact table and specifies constraints on one or more dimension tables associated with said fact table, the method comprising the steps of:

transforming the query to produce a transformed query that includes at least one subquery that is not in the query;

determining a result set for the at least one subquery, said result set including a set of key values;

accessing a bitmap index built on a column of the fact table to retrieve a set of bitmaps associated with said set of key values;

merging said set of bitmaps to generate a subquery bitmap; and determining which data to retrieve from said fact table in response to said query based on said subquery bitmap.

2. The method of claim 1 wherein:

said at least one subquery includes a plurality of subqueries;

the step of determining a result set for the at least one subquery is performed for each subquery of said plurality of subqueries;

a plurality of subquery bitmaps are generated by performing the step of merging said set of bitmaps to generate a subquery bitmap for each subquery of said plurality of subqueries;

the method further includes the step of performing a logical AND operation to combine said plurality of subquery bitmaps into a result bitmap; and the step of determining which data to retrieve from said fact table in response to said query based on said subquery bitmap includes the step of determining which data to retrieve from said fact table in response to said query based on said result bitmap.

3. The method of claim 1 wherein the step of transforming the query includes the steps of adding to a WHERE clause of the query additional subqueries.

4. The method of claim 3 wherein the step of transforming the query further includes constructing the additional subqueries from a set of join predicates and a set of dimension table constraints contained in the query.

5. The method of claim 1 wherein:

the query includes a constraint on a dimension k;

the step of transforming the query includes the step of generating an IN subquery in the form:
   fact.keyk IN (select dimk.key from dimk where <dimk constraints>)
   where dimk is a dimension table, dimk.key is a column of dimk, and fact.keyk is a column of the fact table that a join predicate correlates with dimk.key.

6. The method of claim 5 wherein:

the query includes constraints on a plurality of dimensions;

the step of generating an IN subquery includes generating an IN subquery for each dimension of said plurality of dimensions.

7. The method of claim 1 further comprising the steps of:

identifying, in the query, one or more join predicates that associate a particular column in the fact table and a particular column in a dimension table;

determining whether (a) the particular column in the dimension table is unique and (b) the query contains no references to columns in that particular dimension table other than the one or more join predicates and any constraints that are used in a WHERE-clause of the subquery;

if (a) the particular column in the dimension table is unique and (b) the query contains no references to columns in that particular dimension table other than the one or more join predicates and any constraints that are used in a WHERE-clause of the subquery, then processing the query without executing a join operation between data from the fact table and data from the particular dimension table; and if either the particular column in the dimension table is not unique or the query contains a reference to columns in that particular dimension table other than the one or more join predicates and any constraints that are used in a WHERE-clause of the subquery, then executing a join operation between data from said fact table and data from the particular dimension table.

8. A method for processing a query that requires retrieval of data from a first data repository and specifies constraints on one or more second data repositories that the query associates with said first data repository, the method comprising the steps of:

transforming the query to produce a transformed query that includes at least one subquery that is not in the query, wherein the at least one subquery selects records in the one or more second data repositories based on the constraints specified in the query;

executing said at least one subquery to determine a first set of record identifiers that identify records in said one or more second data repositories that satisfy said at least one subquery;

using said first set of record identifiers as key values to access an index associated with the first data repository to generate a second set of record identifiers that identify records in said first data repository; and determining which data to retrieve from said first data repository in response to said query based on said second set of record identifiers.

9. The method of claim 8 wherein the step of using said first set of record identifiers as key values to access an index associated with the first data repository to generate a second set of record identifiers comprises the steps of:

retrieving a set of bitmaps from said index associated with the first data repository; and merging said set of bitmaps to generate a subquery bitmap.

10. The method of claim 9 wherein:

said at least one subquery includes a plurality of subqueries;

the step executing said at least one subquery is performed for each subquery of said plurality of subqueries;

a plurality of subquery bitmaps are generated by performing the step of merging said set of bitmaps to generate a subquery bitmap for each subquery of said plurality of subqueries;

the method further includes the step of performing a logical AND operation to combine said plurality of subquery bitmaps into a result bitmap; and the step of determining which data to retrieve from said first data repository in response to said query based on said second set of record identifiers includes the step of determining which data to retrieve from said first data repository in response to said query based on said result bitmap.

11. The method of claim 8 wherein the step of transforming the query includes the steps of adding additional subqueries to a WHERE clause of the query.

12. The method of claim 11 wherein the step of transforming the query further includes constructing the additional subqueries from a set of join predicates and a set of second data repository constraints contained in the query.

13. The method of claim 8 wherein:

the first data repository is a fact table;

the second data repositories are dimension tables of the fact table;

the query includes a constraint on a dimension k;

the step of transforming the query includes the step of generating an IN subquery in the form:

fact.keyk IN (select dimk.key from dimk where <dimk constraints>)

where dimk is a second data repository, dimk.key is a column of dimk, and fact.keyk is a column of the first data repository that a join predicate correlates with dimk.key.

14. The method of claim 13 wherein:

the query includes constraints on a plurality of dimensions;

the step of generating an IN subquery includes generating an IN subquery for each dimension of said plurality of dimensions.

15. The method of claim 8 further comprising the steps of:

identifying, in the query, one or more join predicates that associate a particular portion of the first data repository and a particular portion of a particular second data repository;

determining whether (a) values in the particular portion of the second data repository are unique and (b) the query contains no references to portions of the particular second data repository other than the one or more join predicates and any constraints that are used in a WHERE-clause of the subquery;

if (a) values in the particular portion of the second data repository are unique and (b) the query contains no references to portions of the particular second data repository other than the one or more join predicates and any constraints that are used in a WHERE-clause of the subquery, then processing the query without executing a join operation between data from the first data repository and data from the particular second data repository; and if either values in the particular portion of the second data repository are not unique or the query contains references to portions of the particular second data repository other than the one or more join predicates and any constraints that are used in a WHERE-clause of the subquery, then executing a join operation between data from said first data repository and data from the particular second data repository.

16. A computer readable medium having stored thereon sequences of instructions for processing a query that requires retrieval of data from a first data repository and specifies constraints on one or more second data repositories that the query associates with said first data repository, the sequences of instructions comprising sequences of instructions for performing the steps of:

transforming the query to produce a transformed query that includes at least one subquery that is not in the query, wherein the at least one subquery selects records in the one or more second data repositories based on the constraints specified in the query;

executing said at least one subquery to determine a first set of record identifiers that identify records in said one or more second data repositories satisfy said at least one subquery;

using said first set of record identifiers as key values to access an index associated with the first data repository to generate a second set of record identifiers that identify records in said first data repository; and determining which data to retrieve from said first data repository in response to said query based on said second set of record identifiers.

17. The computer readable medium of claim 16 wherein the step of using said first set of record identifiers as key values to access an index associated with the first data repository to generate a second set of record identifiers comprises the steps of:

retrieving a set of bitmaps from said index associated with the first data repository; and merging said set of bitmaps to generate a subquery bitmap.

18. The computer readable medium of claim 17 wherein:

said at least one subquery includes a plurality of subqueries;

the step executing said at least one subquery is performed for each subquery of said plurality of subqueries;

a plurality of subquery bitmaps are generated by performing the step of merging said set of bitmaps to generate a subquery bitmap for each subquery of said plurality of subqueries;

the sequences of instructions further include sequences of instructions for performing the step of performing a logical AND operation to combine said plurality of subquery bitmaps into a result bitmap; and the step of determining which data to retrieve from said first data repository in response to said query based on said second set of record identifiers includes the step of determining which data to retrieve from said first data repository in response to said query based on said result bitmap.

19. The computer readable medium of claim 16 wherein:

the first data repository is a fact table;

the second data repositories are dimension tables of the fact table;

the query includes a constraint on a dimension k;

the step of transforming the query includes the step of generating an IN subquery in the form:

fact.keyk IN (select dimk.key from dimk where <dimk constraints>)

where dimk is a second data repository, dimk.key is a column of dimk, and fact.keyk is a column of the first data repository that a join predicate correlates with dimk.key.

20. The computer readable medium of claim 16 further comprising sequences of instructions for performing the steps of:

identifying, in the query, one or more join predicates that associate a particular portion of the first data repository and a particular portion of a particular second data repository;

determining whether (a) values in the particular portion of the second data repository are unique and (b) the query contains no references to portions of the particular second data repository other than the one or more join predicates and any constraints that are used in a WHERE-clause of the subquery;

if (a) values in the particular portion of the second data repository are unique and (b) the query contains no references to portions of the particular second data repository other than the one or more join predicates and any constraints that are used in a WHERE-clause of the subquery, then processing the query without executing a join operation between data from the first data repository and data from the particular second data repository; and if either values in the particular portion of the second data repository are not unique or the query contains references to portions of the particular second data repository other than the one or more join predicates and any constraints that are used in a WHERE-clause of the subquery, then executing a join operation between data from said first data repository and data from the particular second data repository.

* * * * *